(12) United States Patent
Betz (10) Patent No.: US 11,815,271 B2
(45) Date of Patent: Nov. 14, 2023

(54) DISTRIBUTED HEATING AND COOLING NETWORK

(71) Applicant: Basic Holdings, Dublin (IE)

(72) Inventor: Martin Betz, Annagassan (IE)

(73) Assignee: Basic Holdings, Dublin (IE)

( * ) Notice: Subject to any disclaimer, the term of this patent is extended or adjusted under 35 U.S.C. 154(b) by 0 days.

(21) Appl. No.: 17/258,235

(22) PCT Filed: Jul. 4, 2019

(86) PCT No.: PCT/EP2019/068006
§ 371 (c)(1),
(2) Date: Jan. 6, 2021

(87) PCT Pub. No.: WO2020/007986
PCT Pub. Date: Jan. 9, 2020

(65) Prior Publication Data
US 2021/0278094 A1    Sep. 9, 2021

(30) Foreign Application Priority Data

Jul. 6, 2018 (GB) ..................................... 1811105

(51) Int. Cl.
F24D 19/10     (2006.01)
F24D 3/18      (2006.01)
F24D 5/12      (2006.01)
F24D 11/02     (2006.01)
F24D 10/00     (2022.01)

(52) U.S. Cl.
CPC ............ *F24D 11/0207* (2013.01); *F24D 3/18* (2013.01); *F24D 5/12* (2013.01); *F24D 10/003* (2013.01); *F24D 19/1072* (2013.01)

(58) Field of Classification Search
CPC .... F24D 10/00; F24D 11/001; F24D 11/0207; F24D 19/1039; F24D 19/1072; F24D 3/18; F24D 2200/12; F24D 19/1087
See application file for complete search history.

(56) References Cited

U.S. PATENT DOCUMENTS

| 2007/0205298 | A1* | 9/2007 | Harrison | F24D 11/0221 237/2 B |
| 2012/0279681 | A1* | 11/2012 | Vaughan | F25B 30/06 165/96 |
| 2016/0313033 | A1* | 10/2016 | Chen | F24D 19/1072 |
| 2018/0259197 | A1* | 9/2018 | Rosén | F24D 19/1036 |

(Continued)

FOREIGN PATENT DOCUMENTS

| DE | 202011106855 U1 * | 1/2012 | .......... F24D 11/0221 |
| DE | 20 2012 103 891 U1 | 12/2012 | |
| FR | 2 698 159 A1 | 5/1994 | |

(Continued)

OTHER PUBLICATIONS

International Search Report and Written Opinion from corresponding International Patent Application No. PCT/EP2019/068006, dated Sep. 23, 2019.

*Primary Examiner* — Frantz F Jules
*Assistant Examiner* — Martha Tadesse
(74) *Attorney, Agent, or Firm* — KUSNER & JAFFE (57) ABSTRACT

A distributed heating and cooling network is described. In one aspect a distributed heating and cooling network used in a district heating architecture is described.

22 Claims, 6 Drawing Sheets

(56) References Cited

U.S. PATENT DOCUMENTS

2020/0096205 A1\* 3/2020 Rosén ................... F24D 10/003

FOREIGN PATENT DOCUMENTS

| GB | 2544063 A | 5/2017 |
| GB | 2555762 A | 5/2018 |
| WO | WO-2009/139699 A1 | 11/2009 |
| WO | WO-2010/145040 A1 | 12/2010 |
| WO | WO-2017/076866 A1 | 5/2017 |

\* cited by examiner

DISTRIBUTED HEATING AND COOLING NETWORK

FIELD

The present application relates to a distributed heating and cooling network.

BACKGROUND

Heat pumps are well known in the art and can be defined as any device that provides heat energy from a source of heat to a destination called a "heat sink". Heat pumps are designed to move thermal energy opposite to the direction of spontaneous heat flow by absorbing heat from a cold space and releasing it to a warmer one. A heat pump uses some amount of external power to accomplish the work of transferring energy from the heat source to the heat sink. By definition, all heat sources for a heat pump must be colder in temperature than the space to be heated. Most commonly, heat pumps draw heat from the air (outside or inside air) or from the ground.

It is known to use heat pumps as a source of heat for heating an air space such as within a building, or as a source of heating for domestic hot water. Typically, a single heat pump will be connected to a single source and then the output from that heat pump is selectively used to transfer heat to air inside a building or transfer heat to a heating circuit and/or a tank of domestic hot water.

Known applications of heat pumps include their use in district heating. District heating is a system for distributing heat generated in a centralized location for residential and commercial heating requirements such as space heating and water heating. The heat is often obtained from a cogeneration plant burning fossil fuels but increasingly also biomass, although heat-only boiler stations, geothermal heating, heat pumps and central solar heating are also used, as well as nuclear power. District heating plants can provide higher efficiencies and better pollution control than localised boilers. Despite these advantages, there continues to exist a need for improvement in district heating architectures.

The efficiency of heat pumps is predicated on the environment on which they are based being useable as a source of energy at the time when the heat pump operation is required.

SUMMARY

To address these and other needs, the present teaching provides a distributed heating and cooling network for installation in a building having a plurality of rooms, the network comprising a plurality of heat pumps and a plurality of separate cold emitters, each heat pump and each cold emitter being independently coupled to a common liquid loop of the network. Within the context of the present teaching, the rooms will typically define living units such as apartments or commercial units/space including individual office spaces. In this context, an individual apartment may comprise a plurality of rooms. Each apartment will have heating and cooling requirements, the heating requirements are provided by at least one heat pump that selectively extracts heat from the common liquid loop to deliver heat to the apartment. Similarly, the cooling requirements are met by a cold emitter that is independently coupled to the common liquid loop and whose operation can be used to extract heat from the apartment and deliver that heat to the common liquid loop. Examples of cold emitters that can be usefully employed within the context of the present teaching include fan coils, chilled beams, fan assisted convectors and in climates with low relative humidity underfloor heating.

It will be appreciated that in building with a plurality of apartments, that the heating and cooling requirements of individual apartments may well vary such that the activation of a heat pump in a first apartment to deliver heat to that apartment does not require the activation of a heat pump that is located in a second apartment. Similarly, the orientation of the apartments within the overall building may require certain apartments to have a cooling requirement while other apartments have a heating requirement. The present teaching addresses these scenarios by having the plurality of heat pumps and plurality of cold emitters independently operable.

In this way such a network may be operable in distinct heating and cooling modes of operation. During a cooling operation, at least one of the plurality of individual cold emitters is coupled to the common liquid loop and is configured to extract heat from the room in which it is located and to transfer that heat to the common liquid loop. During a heating operation, which may be one or both of space heating and direct hot water heating, at least one of the plurality of individual heat pumps is configured to extract heat from the common liquid loop and to use that heat to effect a heating of the room which is served by that heat pump.

In certain arrangements, the plurality of heat pumps and the plurality of cold emitters may also be coupled to direct electrical sources such as PV and PVT panels, the electricity grid or the like. Each heat pump of the distributed network may be individually coupled to the common liquid loop, each of the individual heat pumps being arranged to independently extract heat from the common liquid loop. In such arrangements, each of the heat pumps may be arranged to independently extract heat from common liquid loop such that individual apartment or other units can be independently heated. In a preferred arrangement the heat pumps are coupled to the return circuit of the common liquid loop as the temperature of the return circuit is typically higher than that of the flow circuit and hence the efficiency of the heat transfer operation is increased. However, it will be appreciated that the heat pumps could also be coupled to the flow circuits. Each cold emitter of the distributed network is similarly individually and independently coupled to the common liquid loop, such that it can independently provide heat to the common liquid loop.

In a preferred arrangement, the common liquid loop is water based liquid circuit. Examples of same include pure water, water with salt additives such as brine or water with various anti-freeze components. It will be appreciated from the present teaching that in a cooling mode of operation it is preferred that the temperature of the common liquid loop is maintained at a temperature that is lower than ambient temperature—typically significantly lower, for example less than 10 degrees where the ambient temperature is greater than 20 degrees centigrade. Where the temperature of that loop is forced closer to freezing temperatures, the use of anti-freeze constituents in the liquid loop may be advantageously employed.

At least one of the heat pumps may be coupled to a dedicated tank of domestic hot water such that a heat from that heat pump is used to provide a heating of water within that dedicated tank.

The heat pumps can be configured such that in a first mode, the at least one heat pump is configured to use the common liquid loop to provide hot water which is then stored in the dedicated tank. In a second mode, the heat pump may be used to provide space heating whereby the heat pump is configured to use the common liquid loop to provide a source of heat for a dedicated heating circuit—such as a radiator circuit, a fan coil, underfloor heating or some other distributed heating network.

During cooling operations, the network may be configured to receive excess heat from the cold emitters and to subsequently extract that heat using the heat pumps and deliver that heat from the common liquid loop into the dedicated tank.

The network architecture may also include one or more buffer or heat sink modules which can be used to divert excess heat from the common liquid loop. Examples include cold stores, warm stores, heat sources, chillers and the like. These may be advantageously employed in cooling operations where there is a desire to reduce the temperature of the common liquid loop to temperatures below 10 degrees centigrade.

The network may be extended to allow connection to a wide area district heating or cooling network such as that provided within the context of a larger city or community wide district heating or cooling network.

Accordingly, a first embodiment of the application provides a distributed heating and cooling network as detailed in claim 1. Advantageous embodiments are provided in the dependent claims.

BRIEF DESCRIPTION OF THE DRAWINGS

The present application will now be described with reference to the accompanying drawings in which.

DETAILED DESCRIPTION OF THE DRAWINGS

FIGS. 1 to 6 are exemplary schematics of a district heating and cooling architecture in accordance with the present teaching. In the examples shown, an apartment building 100 comprises a plurality of individual dwellings 101a . . . 101h which may be considered within the context of the present teaching as individual units 105 each typically having a plurality of rooms. Within each dwelling or unit is provided at least one individual heat pump 110a . . . 110h whose primary function is to provide heating to that unit. Within each dwelling or unit there is also provided at least one cooling emitter in the form of a cold emitter 510 whose primary function is to provide cooling for that unit.

Each of the plurality of heat pumps 110a . . . 110h and cold emitters 510, are individually and independently coupled to a common liquid loop 120 which is typically provided in the form of a water circuit. By the phrase "independently and individually" is meant that in a cooling mode of operation, the coupling of the cold emitters to the liquid is not via the heat pump. In this way, the heat pump and the cold emitter of a particular unit have their own independent coupling to the common liquid loop. It will be understood in the context of the present teaching that a unit may comprise a plurality of rooms—for example each apartment dwelling may comprise multiple rooms whose heating and cooling requirements may be served by a single heat pump and cold emitter respectively, or which require a plurality of heat pumps and cold emitters as appropriate.

As a result of providing the plurality of heat pumps individually coupled to the common liquid loop 120, each of the individual heat pumps can independently extract heat from the common liquid loop 120. As a result of providing the plurality of cold emitters individually coupled to the common liquid loop 120, each of the cold emitters can independently extract heat from the room in which is located and provide the heat to the common liquid loop 120. In a seasonal period where heating is a dominant requirement of the network, a controller may be interfaced with the common liquid loop to maintain the temperature of the common liquid loop at or relatively close to the desired ambient temperature of the rooms which are being heated—for example in the range 18 to 25 degrees temperatures. In a seasonal period where cooling is a dominant requirement of the network, the controller may be configured to ensure that the common liquid loop is maintained at a temperature lower than the ambient temperature of the rooms being served.by the cold emitters. In an arrangement where the cold emitters are active to generate localised cooling within their immediate vicinity, the temperature of the common liquid loop is preferably cooled to significantly below ambient temperature. This temperature is desirably in the range 5 to 12 degrees centigrade. Desirably the temperature is less than 10 degrees centigrade. Such use of a cooled common liquid loop improves the efficiency of the heat transfer process from the cold emitters.

Figure 4:
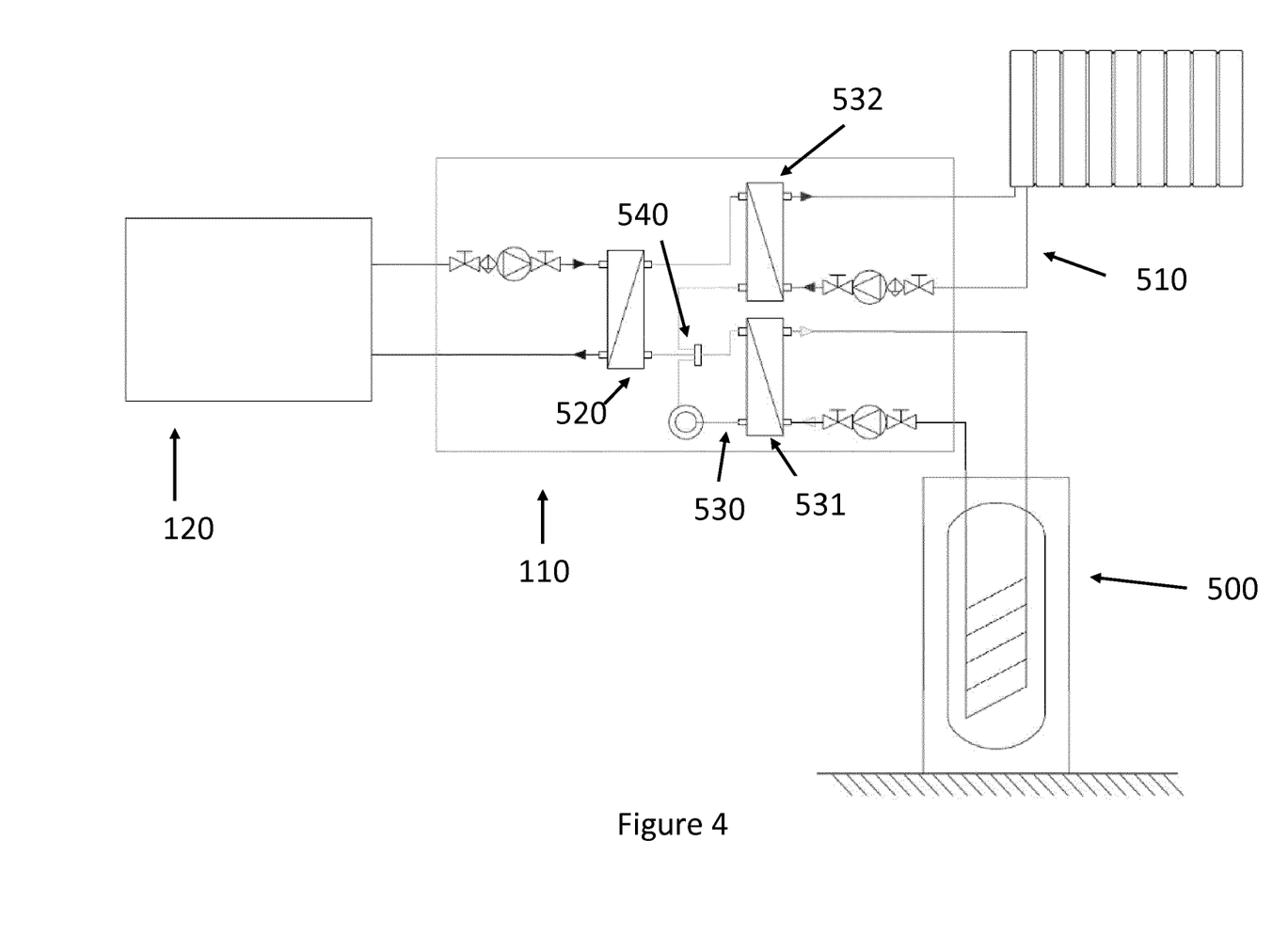
FIG. 4 is a schematic showing an individual heat pump per the arrangement of FIG. 1, as coupled to a local load per the present teaching to provide heating in the form of hot water or space heating.
Figure 5:
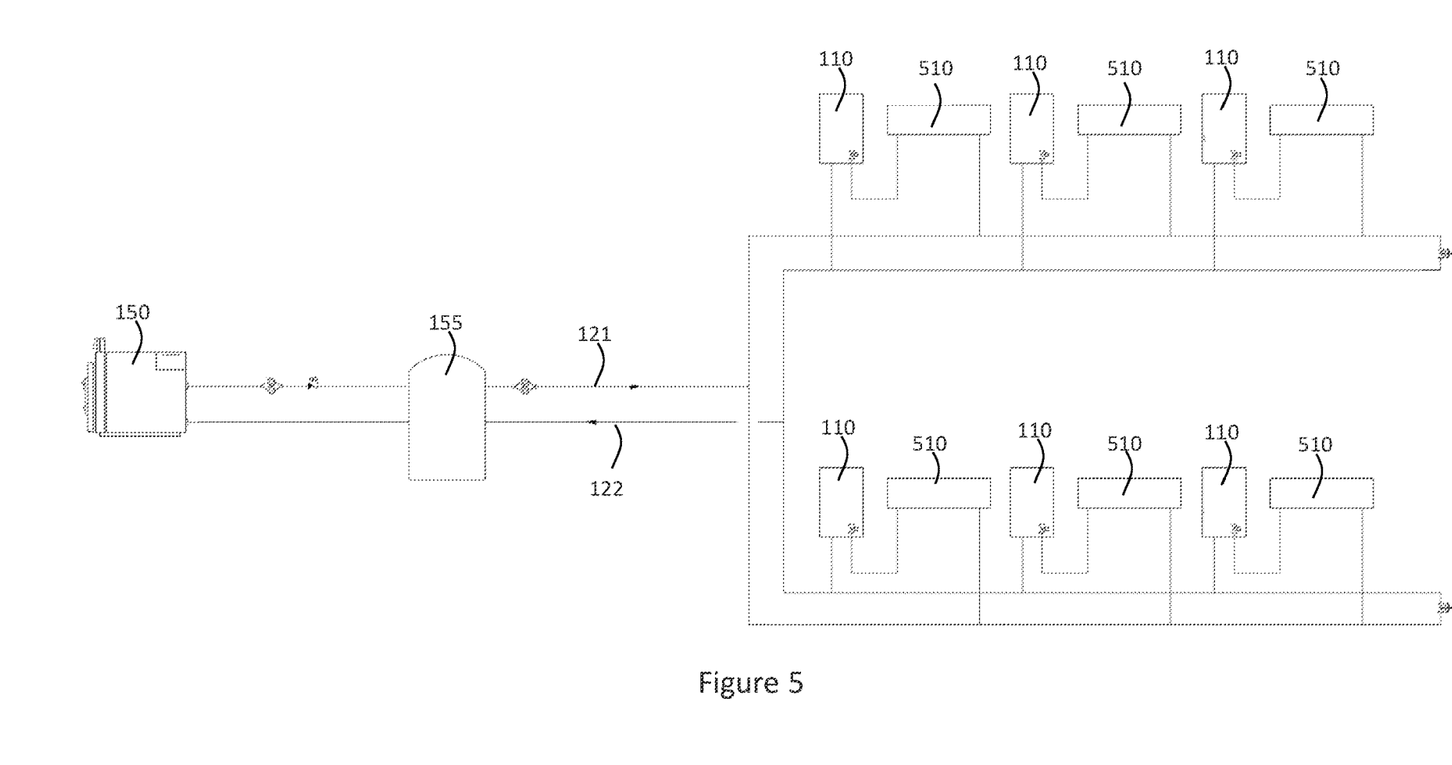
FIG. 5 is a schematic of a distributed network for heating and cooling operation per the arrangement of FIG. 1, showing a plurality of heat pumps and a plurality of cold emitters independently coupled to a common liquid loop.
Figure 6:
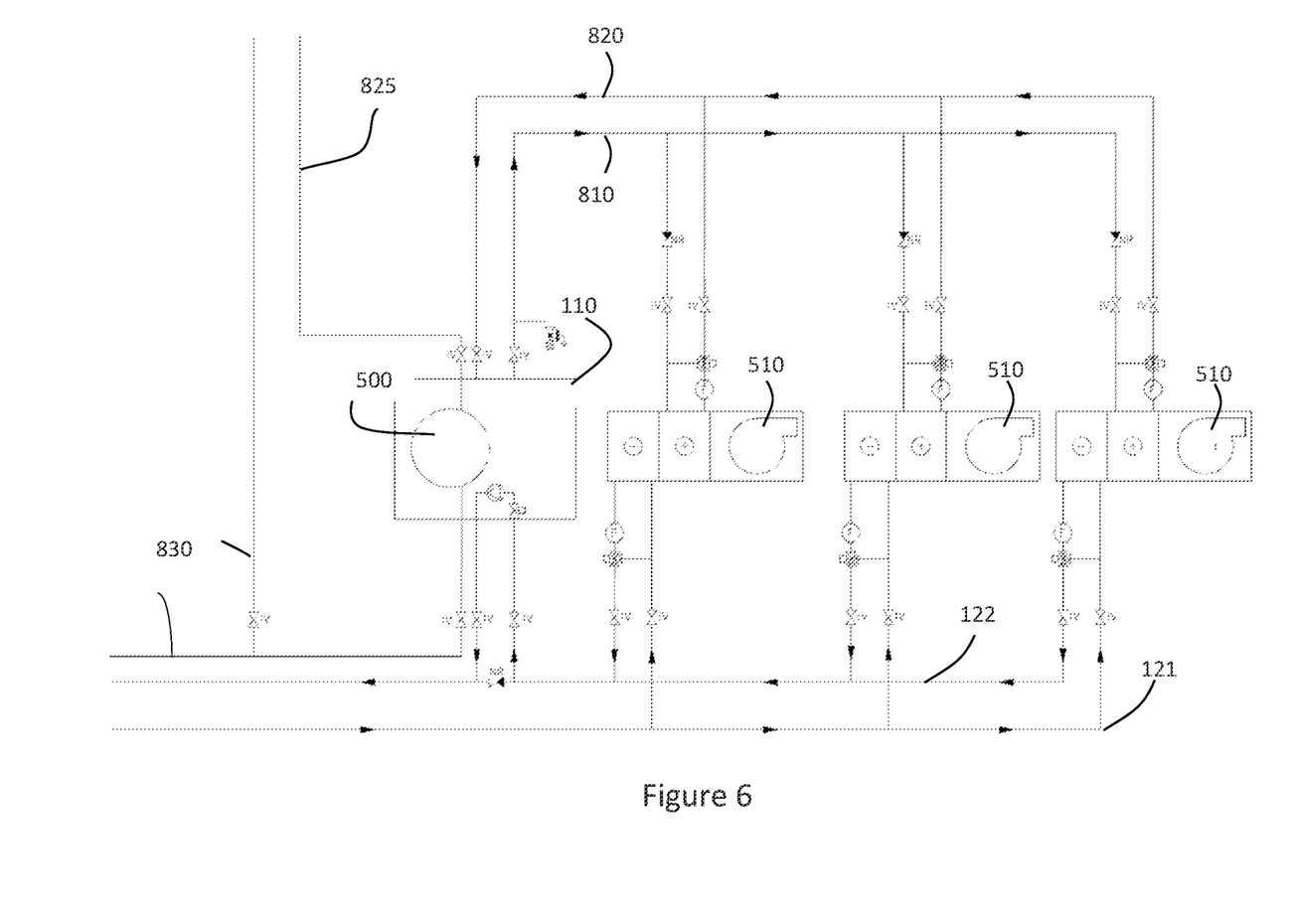
FIG. 6 is a more complex schematic to that shown in FIG. 5 of a distributed network for heating and cooling operation per the arrangement of FIG. 5, showing a heat pump coupled to a plurality of cold emitters.

As is shown in the schematics of FIGS. 4 to 6, each of the individual heat pumps 110 may be coupled to a dedicated tank of domestic hot water 500 such that heat from that heat pump is used to provide a heating of water within that dedicated tank 500. Each of the heat pumps 110 may also be coupled to a local heating circuit or other source of distributed heating 510.

The network architecture may also include one or more buffer 155 or heat sink modules which can be used to divert excess heat from the common liquid loop 120. Examples include cold stores 130, warm stores 140, heat sources, chillers 150 and the like.

The network architecture may comprise one or more heat source components such as a ground source array 160, gas or oil boilers 170, CHP plants 180, biomass boilers 190, air source heat pumps 200 or the like which are coupled to the common liquid loop 120 which are useable in a heating mode of the network to deliver heat to the common liquid loop. One or more heat sources may be coupled to a heat pump 165. The architecture may also comprise one or more chillers which are useable in a cooling mode of the network to extract heat from the common liquid loop. The temperature of the common liquid loop can be independent of, or thermally decoupled from, the energy provided by these heat sources. In such configurations, the common liquid loop thermally decouples the heat source components from the plurality of heat pumps and cold emitters of the distributed heating and cooling network.

The individual heat pumps may be configured to provide a plurality of modes. In a first mode as shown in FIG. 4, an individual heat pump 110 is configured to use the common liquid loop 120 to provide hot water which is then stored in the dedicated tank or cylinder 500. In this arrangement, a valving configuration can be used to direct cool water from the common liquid loop 120 through an evaporator component 520 of the heat pump. Per conventional operation of a heat pump, this flow of cool water through the evaporator can be used in a heat exchanger to provide a source of hot water on a condenser loop 530 of the heat pump which is coupled to a hot water condenser 531.

In a second mode which may also be understood from inspection of FIG. 4, the heat pump may be used to provide space heating. The cool water from the common liquid loop 120 is circulated through the evaporator 532—similar to FIG. 5—where it provides a heat differential between the evaporator 532 and the condenser 520. This heat differential provides heat into the condenser loop that then provides heat for space heating 510. The heat pump in this way is configured to use the common liquid loop to provide a source of heat for a dedicated heating circuit 510—such as a radiator circuit or a cold emitter or through another heat distribution component such as an underfloor heating circuit.

As shown in the example of FIGS. 5 and 6, each heat pump 110 is coupled to a heat distribution component which may be a fan coil (which in this exemplary configuration is configurable as both a heating component and a cooling component), radiator circuit or underfloor heating circuit and, when so coupled, provides a source of heat to the heat distribution component 510. Heat may be provided to heat distribution component 510 via a first coupling circuit 810.

During cooling operations, the heat pump 110 is decoupled from the plurality of fan coils which now function as individual cold emitters 510 which are independently coupled to the common liquid loop and are configured to extract heat from a room in which they are located and transfer that heat to the common liquid loop 120. During cooling operations, the network may be configured to use the excess heat that has been delivered into the common liquid loop from the cold emitters as an input to the heat pump 110 which can then be used to deliver hot water into the dedicated tank 500 via a second coupling circuit 820. This dedicated tank may be coupled to both a domestic hot water circuit 825 and a domestic cold water supply 830.

The network may comprise a valve that is switched to avoid heating operations during cooling operations. In this way, the heating and cooling configurations may be selectively controlled such that operation in a heating mode deactivates operation in a cooling mode and vice versa. It will be appreciated however that in certain configurations, such as apartment buildings that have both north and south facing apartments, there may be a need to provide concurrent heating to one set of apartments—those for example on the north face of the building—while providing a cooling mode to the apartments on the south face of the building. In this way, a heat pump that is coupled to the common liquid loop may be active and extracting heat from the common liquid loop to heat the north facing apartment while a cold emitter that is coupled to the common liquid loop is delivering heat to the common liquid loop as part of its cooling of a south facing apartment.

Figure 3:
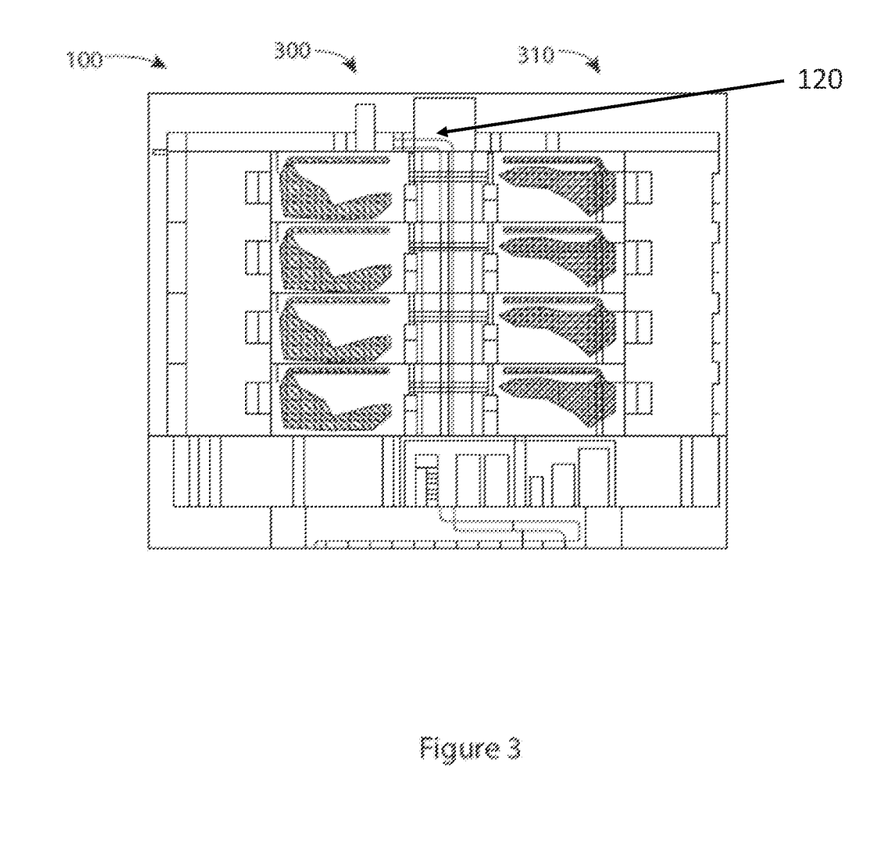
FIG. 3 is an example of the architecture of FIG. 1 operable in a heating and cooling configuration.

By providing a plurality of such heat pumps and cold emitters which have independent connections to the common liquid loop, room heat collected by the cold emitter is diverted into the common liquid loop where it can be used as a source of heat for a heat pump located in a different room. An example of such a configuration-which will be appreciated is idealised for exemplary purposes—is shown in FIG. 3. The dwellings on the left-hand side, LHS, 300 of the building 100 are arranged to have an active cooling and therefore are diverting excess heat into the common liquid loop 120 whereas those dwellings on the right-hand side, RHS, 310 are arranged in a heating configuration to take that heat and generate a heating within their local environment. The heat pumps within each dwelling on the right-hand side 310 of the schematic extract heat from the common liquid loop 120 which is then used to supply heat via a radiator circuit or a via fan coils. Cold emitters in each dwelling on the LHS extract heat from a room in which they are located and transfer that heat to the common liquid loop. The heating and cooling requirements within the overall network are balanced on the common liquid loop 120 which may be moderated or otherwise controlled by selective activation of heat generators 160, 170, 180, 190, 200, buffers and heat sinks 150, 130, 140 etc. In addition, during cooling operation, the network may be configured to use a concurrently operating heat pump to extract heat from the common liquid loop to effect a space heating or a heating of water within a hot water tank. By coupling the plurality of heat pumps and cold emitters into the network, the overall heating and cooling load is balanced and therefore the overall energy requirement for the building as a whole is reduced.

Figure 1:
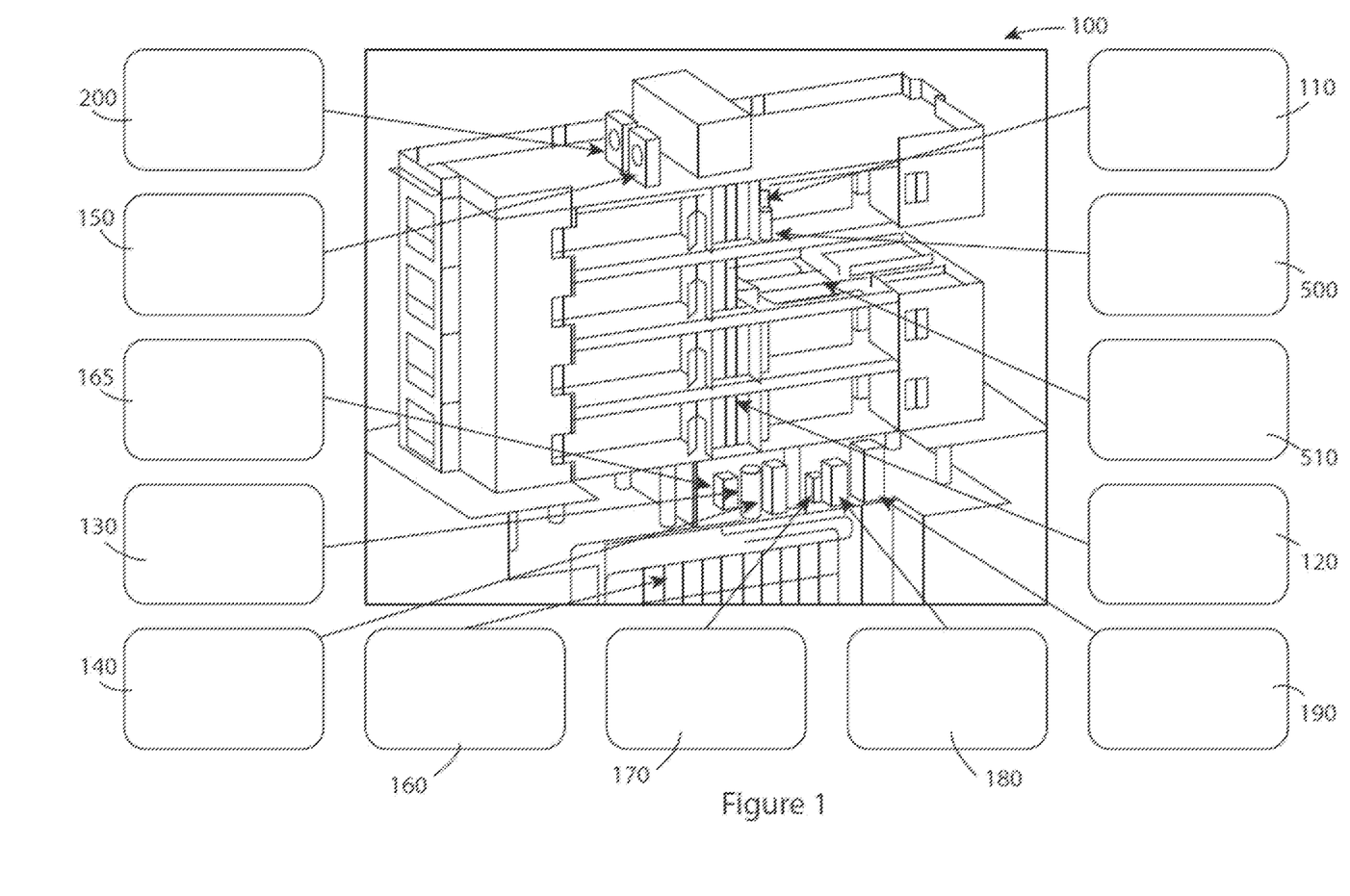
FIG. 1 is a schematic of an architecture including distributed network for heating and cooling operation.
Figure 2:
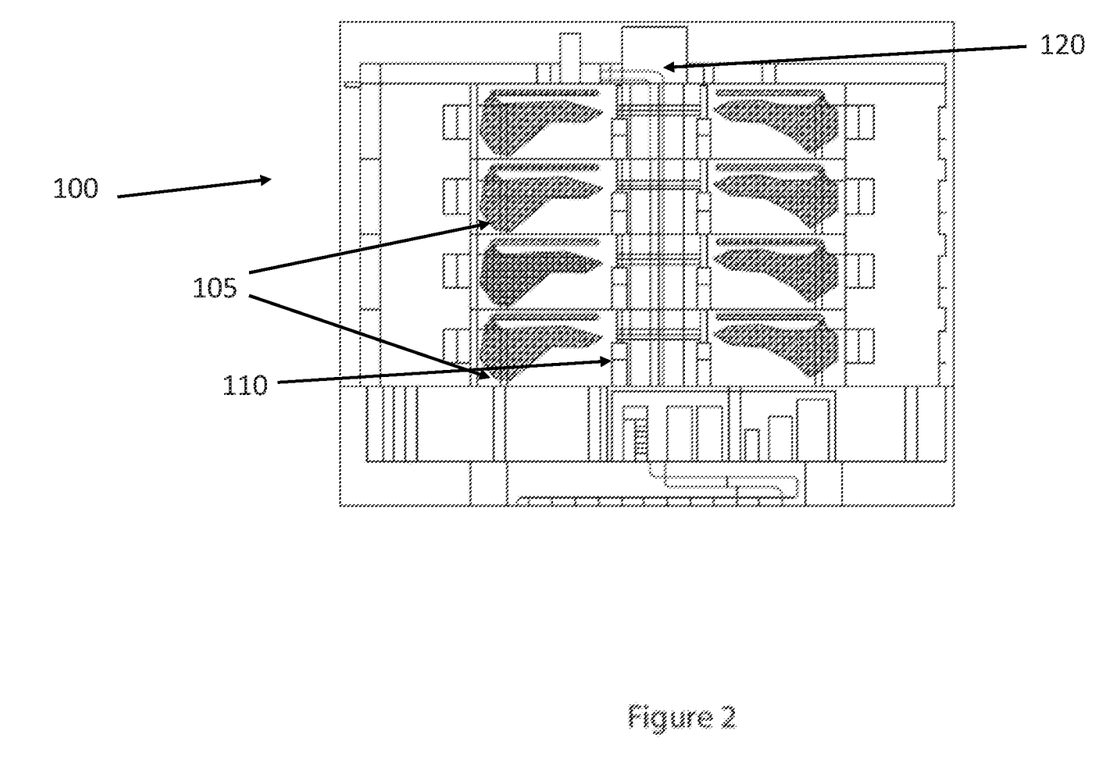
FIG. 2 is an example of the architecture of FIG. 1 operable in a heating load configuration.

In the example of FIG. 2, all dwellings are provided in space heating mode whereby the common liquid loop 120 is maintained at a temperature lower than ambient temperature through active management. During heating operations, each individual heat pump 110 extracts heat from the common liquid loop 120 and supplies a local heat emitter which can be used for heating domestic hot water or space heating. In the example of FIGS. 7 and 8, the local heat emitter is a fan coil 510. In this configuration, the fan coil 510 is not directly connected to the common liquid loop during heating operation, but instead is connected via the heat pump.

In the example of FIG. 3, during cooling operations, each individual cold emitter extracts heat from the room in which they are located and supplies the heat to the common liquid loop.

The efficiency of the heat transfer process during this cooling mode can be increased by having the temperature of the common liquid loop at a temperature that is significantly lower than the ambient temperature. It will be appreciated for example that cooling is typically required when ambient temperatures are more than 20 degrees centigrade and the provision of the common liquid loop at a temperature below 10 degrees centigrade will increase the efficiency of the cooling operation. The maintenance of the common liquid loop temperature lower than ambient is achieved through active management of the common liquid loop. This may be achieved through a controller which periodically measures the temperature of the common liquid loop 120 and can be arranged to effect a cooling of the common liquid loop by extracting heat from the loop using the heat sinks and buffers. Coupling a chiller to the common liquid loop can be particularly effective in lowering the temperature of the common liquid loop.

The efficiency of operation in a heating mode will typically require the temperature of the common liquid loop to be higher than that which is optimal for cooling operations. Therefore, the controller may be arranged to operate in seasonal bands where for example in a first seasonal time period the cooling regime is expected to be more dominant and the temperature of the common liquid loop is reduced. In a second seasonal time period the heating regime is expected to be more dominant and the controller is configured to maintain the temperature of the common liquid loop at a higher temperature. The active management of this temperature regime may be pre-programmed in the controller or could be remotely controlled through a network interface providing control signals to the controller. In another configuration, the controller could be configured to dynamically monitor the prevalence of heating or cooling demands on the overall network through the selective activation of the individual heat pumps and cold emitters and use that monitoring to feed into decisions as to what temperature is most appropriate for the prevalent load on the network.

In a heating mode, the temperature of the common liquid loop will desirably be maintained at or close to normal preferred indoor temperatures, for example in the range 20-25 degrees centigrade. By decoupling the common liquid loop from heat generators and heat sinks, operation of the controller can selectively couple individual ones of the heat source and heat sink to maintain the temperature of the loop of the common source within such a predetermined range.

In the example of FIGS. 5 and 6, the common liquid loop comprises a flow circuit 121 and a return circuit 122. The temperature of the flow circuit 121 is desirably maintained at a temperature lower than the desired room temperatures for the individual rooms or collection of room units. For example the temperature of the flow circuit is desirably less than or equal to 10 degrees centigrade, desirably in a range of 8-10 degrees centigrade. The temperature of the return circuit 122 is maintained at a temperature lower than or equal to 15 degrees centigrade, desirably in a range of 13-15 degrees centigrade, but certainly not greater that the desired room temperature. As a result of maintaining the common liquid loop at temperatures below the expected room temperature, the cold emitter efficiency during cooling operations is increased.

In a scenario, the cooling load is balanced within each dwelling through a heating of the domestic hot water heating load in each cylinder. There is very high energy efficiency within each dwelling and as a result less heat transfer needed on the overall network. Where required, heating and cooling loads for the overall network may be balanced on the common liquid loop 120.

Each heat pump and cold emitter may also be coupled to direct electrical sources such as PV panels, PVT panels 910, the electricity grid 911 or the like. The PV or PVT panels may be configured to provide electrical supply directly to the cold stores, warm stores, heat sources or chillers.

The heat pump 110 may be integrated with a water cylinder 500, such as was described above. Other arrangements may also integrate the heat pump with a mechanical ventilation heat recovery (MVHR) system—not shown. Control systems may be provided which:

Controls space heating and space cooling;
Controls sanitary hot water production;
Controls MVHR system;
Monitors PV production;
Monitors electricity use of total house;
Monitors electricity use within location where the heat pump is located;
Monitors electricity use within location where the cold emitter is located;
Optimizes local energy use of locally produced electricity
Controls and manages a battery store;
Allows remote access to the controller;
Monitors all the equipment remotely;
Creates alarms if any system starts to perform outside of normal operating parameters;
Allows remote optimisation of system performance In accordance with one aspect of the present teaching a controller which is configured to provide a user interface to effect control of the above elements may be provided.

A network per the present teaching has many advantages over existing cooling and heating network including the fact that the:

The heating and cooling requirements within the overall network are balanced on the common liquid loop which may be moderated or otherwise controlled by selective activation of heat generators, buffers and heat sinks;

By keeping the temperature of the common liquid loop significantly colder than the space to be cooled during a cooling mode of operation, the efficiency of operation of the cold emitter is improved. For example, if the air temperature in the room is 28 degrees centigrade, a liquid loop temperature of 10 degrees can be readily expected to deliver a cold output of about 19 degrees whereas if the liquid loop temperature was about 20 degrees, the expected output would be of the order of 24 degrees temperature for the same operating conditions;

The efficiency of cooling using cold emitters that are directly coupled into the liquid loop is greater than trying to scale heat pumps to provide a cooling operation, where the coefficient of performance of the heat pump is more suited to a heating operation.

The words comprises/comprising when used in this specification are to specify the presence of stated features, integers, steps or components but does not preclude the presence or addition of one or more other features, integers, steps, components or groups thereof.

The invention claimed is:

1. A distributed heating and cooling network for installation in a building having a plurality of rooms, the network comprising: a plurality of individual heat pumps and a plurality of individual cold emitters, the plurality of individual cold emitters being selected from one of fan coils, a chilled beam, and fan assisted convectors, each heat pump of the plurality of individual heat pumps and each cold emitter of the plurality of individual cold emitters being directly and independently coupled to a single common liquid loop of the network, wherein, during cooling operations, at least one of the plurality of individual cold emitters is coupled to the common liquid loop and is configured to extract heat from a room of one of the plurality of rooms in which the at least one of the plurality of individual cold emitters is located and to transfer the heat extracted from the room of one of the plurality of rooms in which the at least one of the plurality of individual cold emitters is located to the common liquid loop, wherein, during heating operations, at least one of the plurality of individual heat pumps is coupled to the common liquid loop and is configured to extract heat from the common liquid loop and transfer the heat extracted from the common liquid loop to the room of one of the plurality of rooms in which the at least one of the plurality of individual heat pumps is located, and wherein, during the cooling operations, at least one individual heat pump of the plurality of individual heat pumps is also coupled to the common liquid loop and is configured to extract heat from the common liquid loop.

2. The network of claim 1, wherein the at least one individual heat pump of one of the plurality of individual heat pumps is configured to deliver that heat to a hot water tank.

3. The network of claim 1, wherein the common liquid loop is maintained at a predetermined temperature through active heat management of the common liquid loop.

4. The network of claim 3, wherein the common liquid loop is maintained at a first temperature in a first seasonal operation and at a second higher temperature in a second seasonal operation.

5. The network of claim 1, wherein the plurality of rooms defines individual units, and wherein one of the plurality of individual cold emitters of a first unit of the individual units is operable in one of the cooling operations concurrently with the one individual heat pump of the plurality of individual heat pumps of a second unit of the individual units being operable in one of the heating operations.

6. The network of claim 1, wherein the common liquid loop comprises a flow circuit and a return circuit.

7. The network of claim 6, wherein, during one of the cooling operations, a temperature of the flow circuit is maintained at a temperature lower than a room temperature of the room of one of the plurality of rooms being cooled, that the temperature desirably being less than or equal to 10 degrees centigrade.

8. The network of claim 7, wherein, during one of the cooling operations, a temperature of the return circuit is maintained at a temperature not higher than a room temperature of the room of one of the plurality of rooms being cooled, that the temperature desirably being lower than or equal to 15 degrees centigrade.

9. The network of claim 1, further including one or more buffer or heat sink modules to divert excess heat from the common liquid loop.

10. The network of claim 9, wherein the one or more buffer or heat sink modules include cold stores, warm stores, heat sources or chillers.

11. The network of claim 9, wherein a temperature of the common liquid loop is decoupled from a temperature of the heat sink modules.

12. The network of claim 1, wherein the at least one individual heat pump of the plurality of individual heat pumps is coupled to a dedicated tank of domestic hot water such that heat from the at least one individual heat pump of the plurality of individual heat pumps is used to provide a heating of water within that the dedicated tank.

13. The network of claim 12, wherein the at least one individual heat pump of the plurality of individual heat pumps is operable in a plurality of modes.

14. The network of claim 13, wherein, during one of the plurality of modes, the individual heat pump of one of the plurality of individual heat pumps is configured to use the common liquid loop to provide heating of water within that the dedicated tank.

15. The network of claim 13, wherein, during one of the plurality of modes, the individual heat pump of one of the plurality of individual heat pumps is configured to provide space heating whereby the individual heat pump of one of the plurality of individual heat pumps is configured to use the common liquid loop to provide a source of heat for a dedicated heating circuit.

16. The network of claim 1, configured to be coupled to a wide area district heating or cooling network.

17. The network of claim 1, comprising at least one variable output heat pump of one of the plurality of individual heat pumps.

18. The network of claim 1, comprising at least one variable output cold emitter of one of the plurality of individual cold emitters.

19. The network of claim 1, wherein the plurality of individual heat pumps and the plurality of individual cold emitters are further coupled to direct electrical sources comprising at least one of: PV panels, PVT panels and an electricity grid.

20. The network of claim 1, wherein each of the plurality of individual heat pumps is arranged to independently extract heat from the common liquid loop, and wherein each of the plurality of individual cold emitters is arranged to independently transfer heat to the common liquid loop.

21. The network of claim 1, wherein the common liquid loop is a liquid circuit.

22. The network of claim 1, comprising a controller, the controller comprising a user interface configured to receive user input to effect control of one or more of:
space heating;
space cooling;
sanitary hot water production;
monitoring photovoltaic production;
monitoring electricity use within location where the individual heat pump of one of the plurality of individual heat pumps is located;
monitoring electricity use within location where the individual cold emitter of one of the plurality of individual cold emitters is located;
optimizing local energy use of locally produced electricity; and
controlling and managing a battery store.

* * * * *